(12) United States Patent
Hammond

(10) Patent No.: US 6,601,615 B1
(45) Date of Patent: Aug. 5, 2003

(54) SECONDARY TWIST WIRE SPREADER TOOL

(75) Inventor: Randy C. Hammond, Angleton, TX (US)

(73) Assignee: JMC Plastics & Mfg., Inc., Houston, TX (US)

( * ) Notice: Subject to any disclaimer, the term of this patent is extended or adjusted under 35 U.S.C. 154(b) by 0 days.

(21) Appl. No.: 10/084,516

(22) Filed: Feb. 27, 2002

(51) Int. Cl.[7] .................................................. B21F 1/00
(52) U.S. Cl. ......................................... 140/123; 81/485
(58) Field of Search ............................... 81/485; 57/23; 140/33, 102.5, 123; 254/1, 131; 72/458

(56) References Cited

U.S. PATENT DOCUMENTS

| | | | |
|---|---|---|---|
| 2,345,324 A | * | 3/1944 | Byers ........................... 81/485 |
| 2,841,364 A | | 7/1958 | Pratt |
| 3,174,723 A | | 3/1965 | McGuire |
| 3,269,706 A | | 8/1966 | Walker |
| 3,295,830 A | | 1/1967 | Bogese |
| 3,336,436 A | | 8/1967 | Markham |
| 3,425,114 A | | 2/1969 | Fellenzer |
| 3,709,264 A | * | 1/1973 | Amman ....................... 140/123 |
| 3,734,462 A | | 5/1973 | Slade |
| 3,918,684 A | | 11/1975 | Pyles |

* cited by examiner

Primary Examiner—Lowell A. Larson
(74) Attorney, Agent, or Firm—John R Casperson

(57) ABSTRACT

A tool for separating twisted wire has a pair of longitudinally-spaced-apart parallel separator elements with each separator element having a post portion, a generally annularly shaped end flange portion positioned on the end of the post portion, and a blade portion protruding outwardly from a periphery of each end flange. Each blade is angled away from the other separator element of the pair at an angle in the range of from about 45 degrees to about 85 degrees and pointed in a direction for co-rotation about an axis between the parallel posts. The blades are inserted between the first wire strand and the second wire strand from opposite directions so that the first wire strand will be guided into position against a first of the posts and the second wire strand will be guided into position against a second of the posts. The tool is then rotated around the axis between the parallel posts to separate the first wire strand from the second wire strand.

13 Claims, 2 Drawing Sheets

SECONDARY TWIST WIRE SPREADER TOOL

BACKGROUND OF THE INVENTION

In one aspect, the invention relates to a tool for separating twist wire. In another aspect, the invention relates to a method for separating twist wire.

Many electric utility companies in the U.S. use secondary twist wire. The wire consists of either 2 or 3 insulated conductors wrapped around a non insulated neutral (ground) conductor. The insulated conductors provide either single phase or three phase power with voltages usually ranging between 240 and 480 volts. The purpose of the twist wire is to transmit secondary power from "distribution type" transformers located on utility poles down to either homes or buildings. In many cases, a single transformer mounted on a utility pole will provide power to several locations.

In a case as described above, most utility companies will run the secondary twist wire from pole to pole. At place where there is a home or building, the twist wire is spread apart between the poles and spliced to wires extending to the home or building. The problem of splicing or tapping the insulated conductors is affected by the bare ground conductor. The portions of the insulated conductors which are bared for tapping must be kept separated from each other and the ground in order to avoid a short circuit. A spacer is therefore installed after the wires are spread to hold the wires apart to prevent short circuits and to facilitate splicing or tapping into each wire.

It is difficult to spread apart the wires to insert the spacer. The wires are large and stiff and they are generally stretched tightly between the poles to maintain adequate ground clearance. Because the wire is suspended and the worker attempting to spread the wires is generally in a lift device, there is no solid, stable object for the worker to apply pressure against to facilitate the separation of the wires.

A tool to facilitate the separation of secondary twist wires for the insertion of a spreader would be very desirable.

It is an object of this invention to provide such a tool.

SUMMARY OF THE INVENTION

In one embodiment of the invention, a wire separator tool comprises a bar having a pair of separator elements. The bar has a first end and a second end. An imaginary longitudinal axis extends between the first end and the second end of the bar. A pair of longitudinally-spaced-apart separator elements extend laterally from one side of the bar. Each separator element has a post portion, a flange portion, and a blade portion. Each post portion has a first end next to the bar and a second end spaced apart from the bar. An imaginary longitudinal axis extends between the first end and the second end of each post portion. A generally annularly shaped end flange portion is positioned on the second end of each of the post portions. The end flange portion extends generally radially outwardly from the longitudinal axis of each of the post portions. A blade portion protrudes outwardly from a periphery of each end flange portion. Each blade portion is angled away from the bar at an angle in the range of from about 5 degrees to about 50 degrees and away from the other post of the pair at an angle in the range of from about 45 degrees to about 135 degrees.

In another embodiment of the invention, there is provided a method for spreading apart a twisted wire assembly comprising at least a first wire strand and a second wire strand twisted together. The method comprises providing a tool having a pair of longitudinally-spaced-apart parallel separator elements with each separator element having a post portion, a generally annularly shaped end flange portion positioned on the end of the post portion, and a blade portion protruding outwardly from a periphery of each end flange. Each blade is angled away from the other separator element of the pair at an angle in the range of from about 45 degrees to about 85 degrees and pointed in a direction for co-rotation about an axis between the parallel posts. The blades are inserted between the first wire strand and the second wire strand from opposite directions so that the first wire strand will be guided into position against a first of the posts and the second wire strand will be guided into position against a second of the posts. The tool is then rotated around the axis between the parallel posts to separate the first wire strand from the second wire strand.

The method can be carried out if desired with the previously described apparatus. The tool handle and blades are preferably made of nonconductive composite materials to permit the lineman to use the tool without having to shut power off to the system. The combination of the blades and the handle permit the wires to be spread easier, farther apart and quicker than anything else on the market. By way of non-limiting example, two wires can be separated and spread to a distance of several inches in just under 3 seconds in a single motion when a preferred embodiment of the invention is used. The invention thus permits a lineman to install even the largest of spacers with little effort or time.

DETAILED DESCRIPTION OF THE INVENTION

Figure 1:
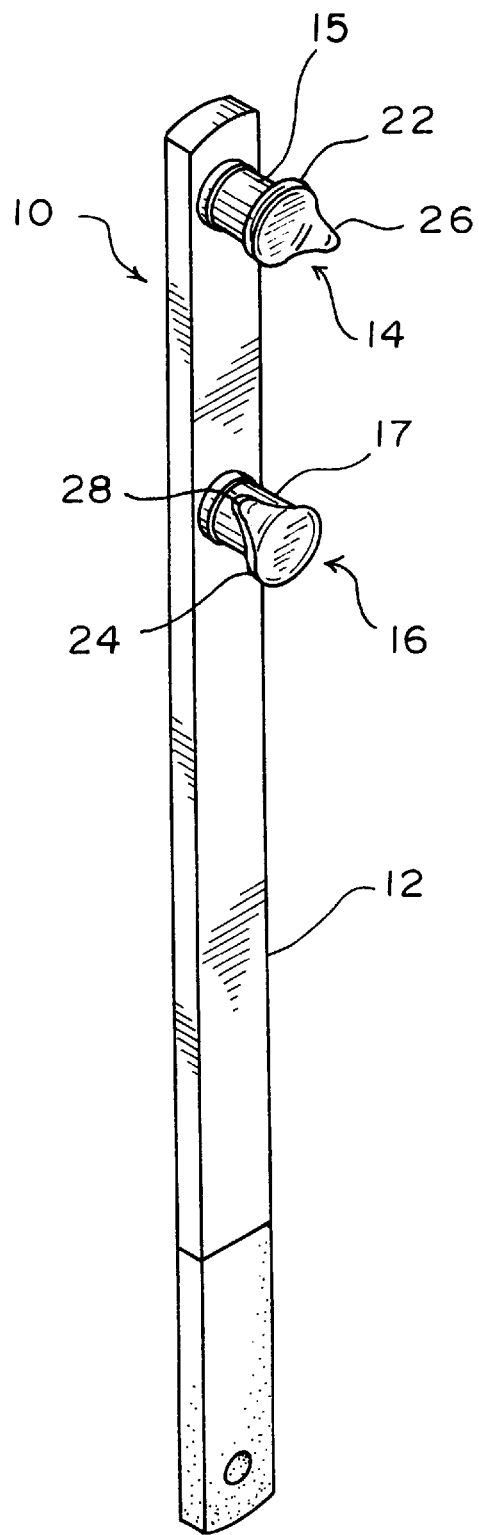
FIG. 1 is a pictorial view of a tool according to one embodiment of the invention.
Figure 2:
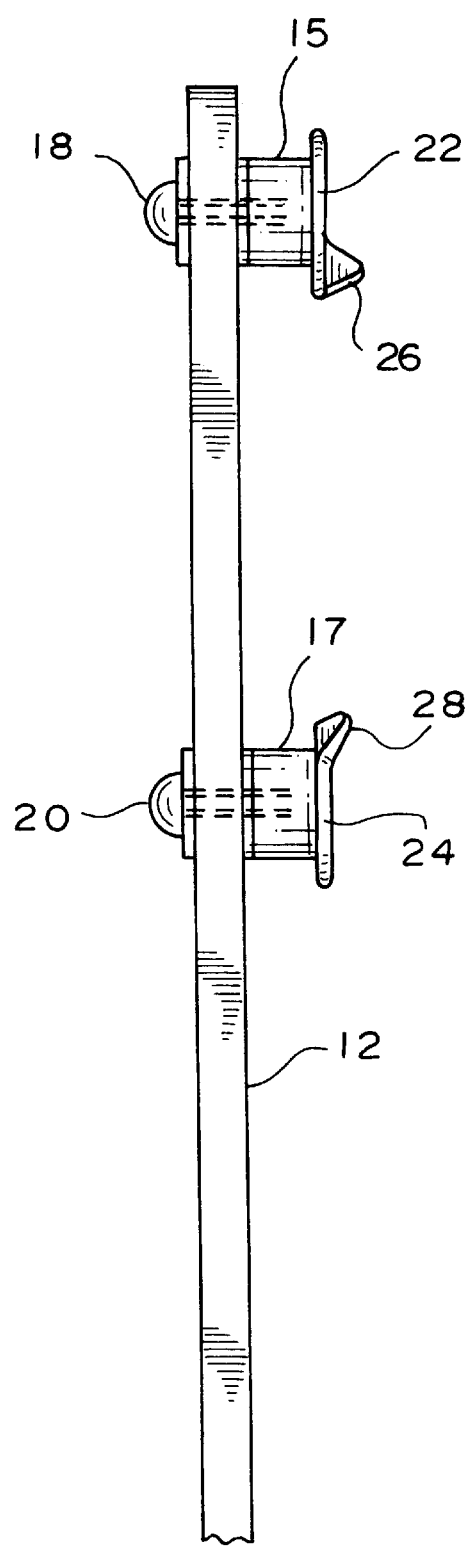
FIG. 2 is a side view of an end portion of the tool shown in FIG. 1, with dashed lines indicating the location of thru-bolts.

With reference to FIG. 1, a separator tool 10 comprises a bar 12 having a pair of protruding separator elements 14 and 16. As shown in FIG. 2, the separator elements can be attached to the bar with thru-bolts 18 and 20. The separator elements 14 and 16 as well as the handle 12 are preferably constructed of non-conductive materials. A number of materials are suitable for each of these pieces.

The bar has a first end and a second end. An imaginary longitudinal axis extends between the first end and the second end of the bar. In a preferred embodiment, the bar has a rectangular cross section transverse to its longitudinal axis and is between about 5 and 50 inches in length. More preferably, the bar is between about 24 and 30 inches in length, which provides a good compromise between compactness and effectiveness as a lever.

The pair of longitudinally-spaced-apart separator elements 14 and 16 extend laterally from one side of the bar. Each separator element has a post portion, an annular flange portion, and a blade portion. The separator elements are preferably identical.

Each post portion 15, 17 has a first end next to the bar and a second end spaced apart from the bar. An imaginary longitudinal axis extends between the first end and the second end of each post portion. The generally annularly shaped end flange portion 22, 24 is positioned on the second end of each of the post portions. The end flange portion extends generally radially outwardly from the longitudinal axis of each of the post portions. The blade portions 26, 28 protrude outwardly from a periphery of each end flange portion. Each blade portion is angled away from the bar at an angle in the range of from about 5 degrees to about 50 degrees (see FIG. 2), preferably in the range of from about 20 degrees to about 40 degrees, and away from the other separator element of the pair at an angle in the range of from about 45 degrees to about 135 degrees (see FIG. 1), preferably at an angle in the range of from about 45 degrees to about 85 degrees. Preferably, each blade portion points away from the other separator element of the pair in a direction which is co-rotational with respect to an axis of rotation 30 (see FIGS. 3 and 4) between the post portions and is generally triangularly shaped. Preferably, the separator elements are of unitary construction and are made by injection molding.

Generally speaking, the separator elements are spaced apart a distance in the range of from about 1.5 inches to about 15 inches. The post portions of the separator elements are preferably generally cylindrically shaped and have a generally circular cross section transverse to the longitudinal axis and a length in the range of from about 0.2 to about 2 inches as measured between the bar and the flange. The flange portions preferably protrude radially outwardly from the generally cylindrical surface of its respective post portion a distance in the range of from about 0.1 inch to about 1 inch and have a thickness in the range of about 0.05 to about 0.5 inches. Each blade portion preferably protrudes radially outwardly beyond a periphery of the flange a distance in the range of from about 0.1 to about 1 inch and has a thickness in the range of from about 0.05 to about 0.5 inches.

Figure 3:
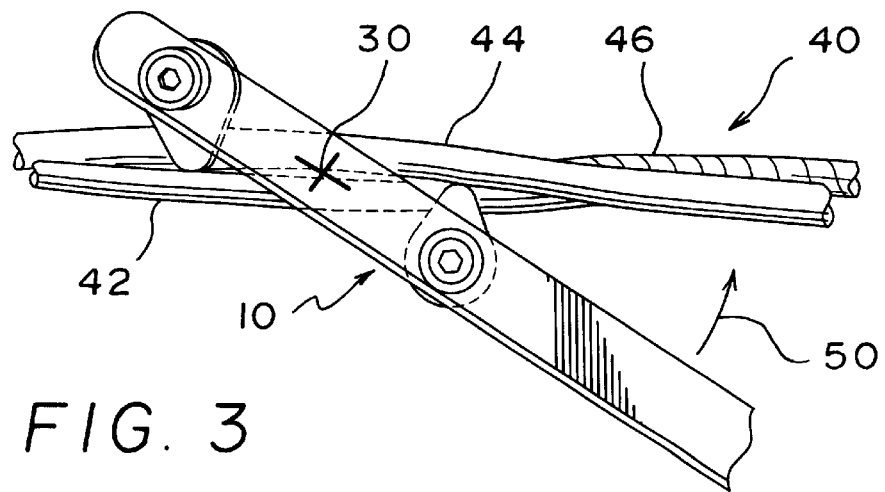
FIGS. 3–5 illustrate use according to an embodiment of the invention.
Figure 4:
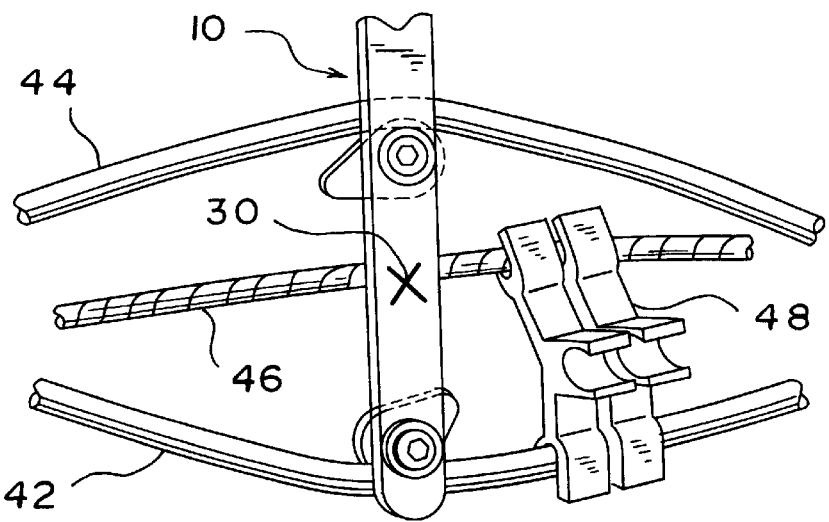
Figure 5:
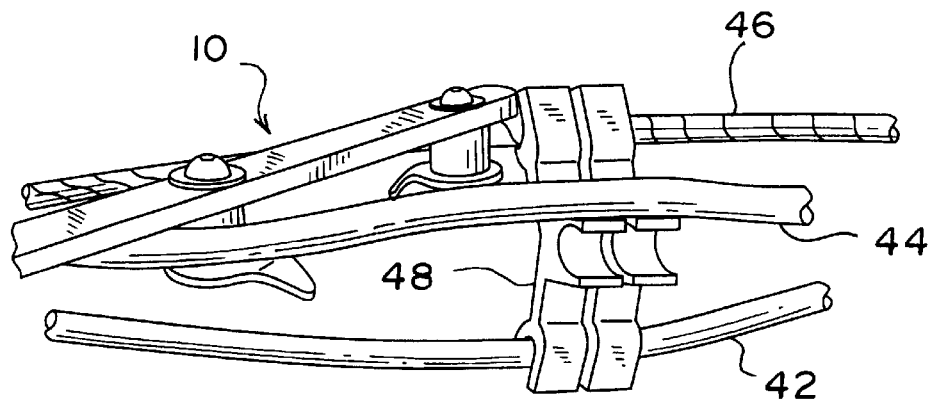

With reference to FIGS. 3–5, in another embodiment of the invention, there is provided a method for spreading apart a twisted wire assembly 40 comprising at least a first wire strand 42 and a second wire strand 44 twisted together. In the illustrated embodiment, the invention is used with clockwise wire, meaning the wire appears to be twisted clockwise when look down the wire. For wire having a counterclockwise twist, the direction of the blades will need to be rotated to provide best results. The method comprises providing a tool 10 having a pair of longitudinally-spaced-apart parallel separator elements with each separator element having a post portion, a generally annularly shaped end flange portion positioned on the end of the post portion, and a blade portion protruding outwardly from a periphery of each end flange. Each blade is angled away from the other separator element of the pair at an angle in the range of from about 45 degrees to about 85 degrees and pointed in a direction for co-rotation about an axis 30 between the parallel posts. The blades are inserted between the first wire strand and the second wire strand from opposite directions so that the first wire strand will be guided into position against a first of the posts and the second wire strand will be guided into position against a second of the posts. The posts are preferably sized and shaped, for example, as shown, so as not to disrupt the insulation of the conductor. The tool is then rotated (see arrow 50 in FIG. 3) around the axis between the parallel posts to separate the first wire strand from the second wire strand. Preferably, the tool is rotated in a single motion to first insert the blades and then separate the wires.

In the illustrated embodiment, the twisted wire assembly further comprises a third wire strand 46. Rotation of the tool around the axis further separates the first wire strand and the second wire strand from the third wire strand. See FIG. 4. A spacer 48 is positioned between the third wire strand and a selected one of the first wire strand and the second wire strand. The tool is removed. The blades of the tool are then inserted between the third wire strand and the remaining one of the first wire strand and the second wire strand from opposite directions so that the third wire strand will be guided into position against a first of the posts and the remaining one of the first wire strand and the second wire strand will be guided into position against a second of the posts. The tool is then rotated around the axis between the parallel posts to separate the third wire stand from the remaining one of the first wire strand and the second wire strand. See FIG. 5. The remaining one of the first wire strand and the second wire strand is then positioned on the spacer, so that the first wire strand, the second wire strand, and the third wire strand are all separated by the spacer. The tool is then removed, the two spacers are spread apart by hand, and the splicing operation is ready to begin.

While certain preferred embodiments of the invention have been described herein, the invention is not to be construed as being so limited, except to the extent that such limitations are found in the claims.

What is claimed is:

1. A tool for separating twisted wires, said tool comprising
   a bar having a first end and a second end and a longitudinal axis extending between the first end and the second end; and
   a pair of separator elements each having a post portion, a generally annular end flange portion and a blade portion, attached to the bar;
   wherein the separator elements are positioned so that the pair of post portions extend laterally from the bar parallel to each other from spaced apart locations, each post portion having a first end next to the bar and a second end spaced apart from the bar and a longitudinal axis extending between the first end and the second end;
   the generally annularly shaped end flange portions are positioned on the second end of each of the post portions and extend generally radially outwardly from the longitudinal axis of each post portion; and
   the blade protrudes outwardly from a periphery of each end flange portion and is angled away from the bar at an angle in the range of from about 5 degrees to about 50 degrees and away from the other separator element of the pair at an angle in the range of from about 45 degrees to about 135 degrees.

2. A tool as in claim 1 wherein each blade portion points away from the other separator element of the pair in a direction which is co-rotational with respect to an axis of rotation between the post portions.

3. A tool as in claim 2 wherein each blade portion points away from the other separator element of the pair at an angle in the range of from about 45 degrees to about 85 degrees.

4. A tool as in claim 3 wherein each blade portion is angled away from the bar at an angle which is in the range of from about 20 degrees to about 40 degrees.

5. A tool as in claim 4 wherein each blade portion is generally triangularly shaped.

6. A tool as in claim 5 wherein the separator elements are spaced apart a distance in the range of from about 1.5 inches to about 15 inches and the bar has a rectangular cross section transverse to its longitudinal axis.

7. A tool as in claim 6 wherein each post portion is generally cylindrical and has a generally circular cross section transverse to its longitudinal axis and a length in the range of from about 0.2 to about 2 inches as measured between the bar and the flange portion.

8. A tool as in claim 7 wherein each flange portion protrudes radially outwardly from the generally cylindrical surface of its respective post portion a distance in the range of from about 0.1 inch to about 1 inch and has a thickness in the range of about 0.05 to about 0.5 inches.

9. A tool as in claim 8 wherein each blade portion protrudes radially outward beyond a periphery of the flange a distance in the range of from about 0.1 to about 1 inch and has a thickness in the range of from about 0.05 to about 0.5 inches.

10. A tool as in claim 9 wherein the bar has a length in the range of from about 5 inches to about 50 inches and the separator elements are positioned near the second end of the bar.

11. A method for spreading apart a twisted wire assembly comprising at least a first wire strand and a second wire strand twisted together, said method comprising providing a tool having a pair of longitudinally-spaced-apart parallel posts with each post having a generally annularly shaped end flange positioned on its end and a blade protruding outwardly from a periphery of each end flange, each blade being angled away from the other post of the pair at an angle in the range of from about 60 degrees to about 90 degrees for co-rotation about an axis between the parallel posts, inserting the blades between the first wire strand and the second wire strand from opposite directions so that the first wire strand will be guided into position against a first of the posts and the second wire strand will be guided into position against a second of the posts, and rotating the tool around the axis between the parallel posts to separate the first wire strand from the second wire strand.

12. A method as in claim 11 further comprising rotating the tool around the axis between the parallel posts to insert the blades between the first wire strand and the second wire strand from opposite directions.

13. A method as in claim 12 wherein the twisted wire assembly further comprises a third wire strand, wherein rotating the tool around the axis further separates the first wire strand and the second wire strand from the third wire strand, said method further comprising positioning a spacer between the third wire strand and a selected one of the first wire strand and the second wire strand, removing the tool, inserting the blades of the tool between the third wire strand and the remaining one of the first wire strand and the second wire strand from opposite directions so that the third wire strand will be guided into position against a first of the posts and the remaining one of the first wire strand and the second wire strand will be guided into position against a second of the posts, rotating the tool around the axis between the parallel posts to separate the third wire stand from the remaining one of the first wire strand and the second wire strand, positioning the remaining one of the first wire strand and the second wire strand on the spacer, so that the first wire strand, the second wire strand, and the third wire strand are all separated by the spacer, and removing the tool.

* * * * *